No. 836,729. PATENTED NOV. 27, 1906.
J. P. & C. F. WRIGHT.
BOX FILLING MACHINE.
APPLICATION FILED JUNE 30, 1903.
6 SHEETS—SHEET 1.
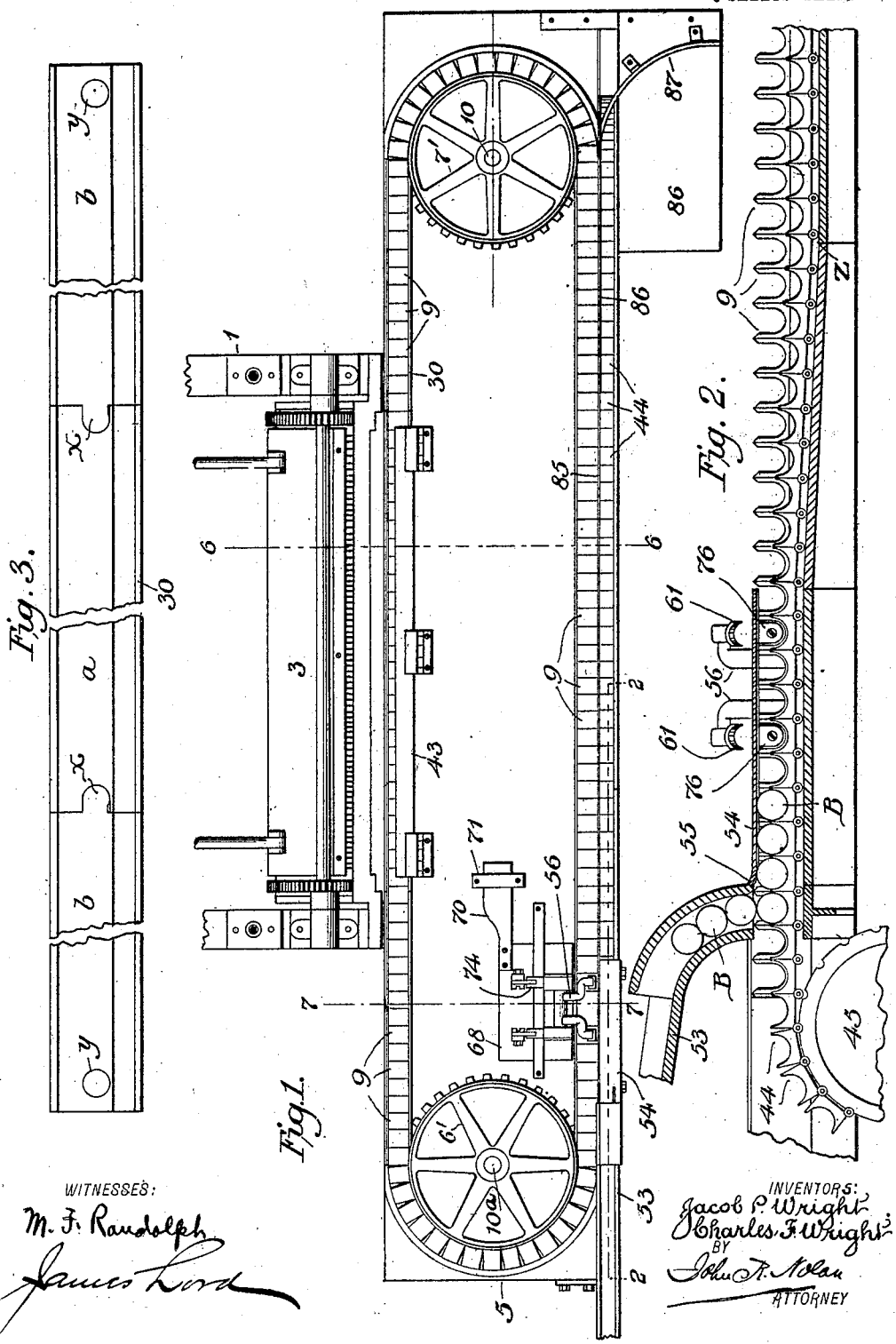

No. 836,729. PATENTED NOV. 27, 1906.
J. P. & C. F. WRIGHT.
BOX FILLING MACHINE.
APPLICATION FILED JUNE 30, 1903.
6 SHEETS—SHEET 2.
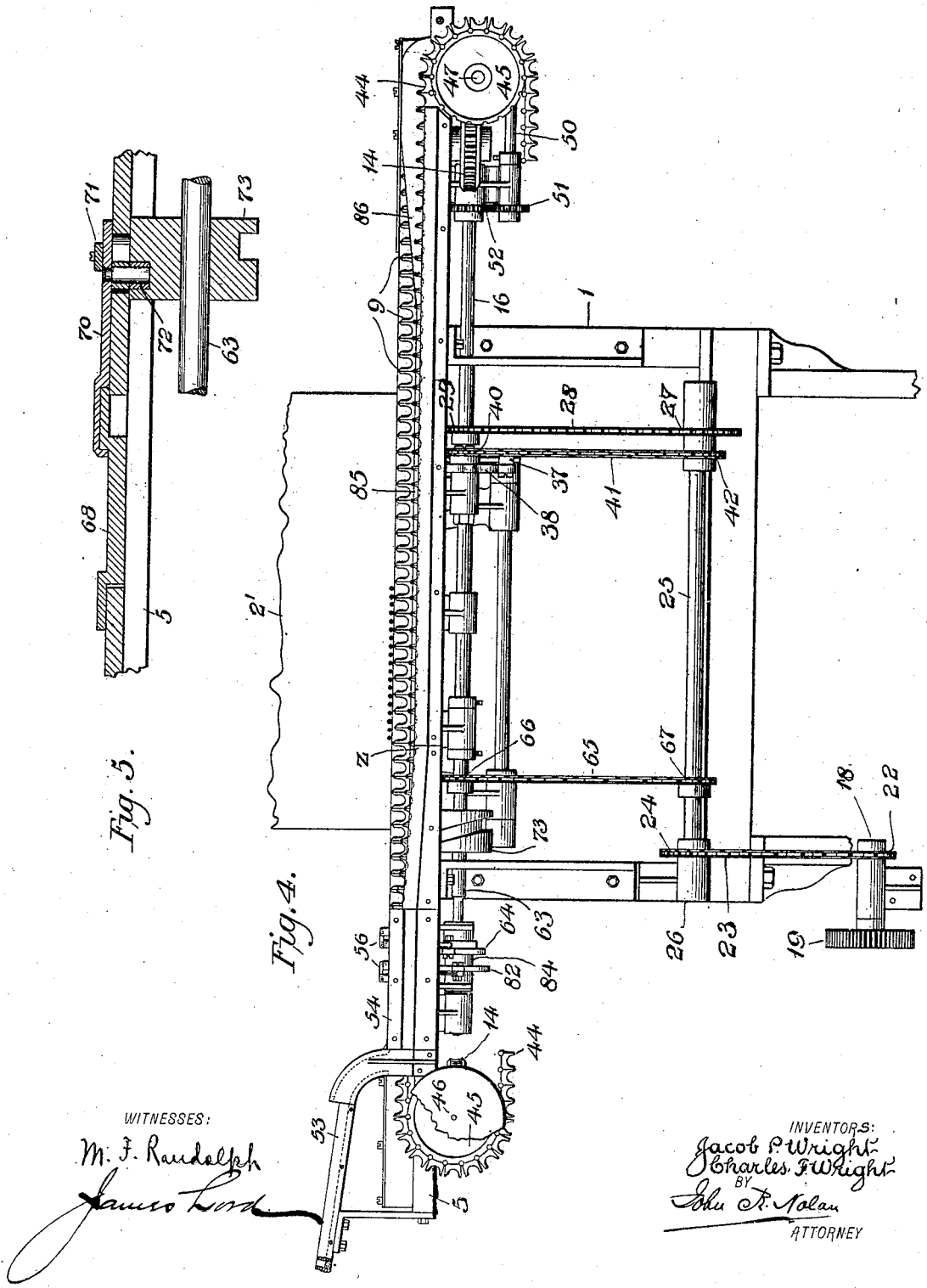
WITNESSES:
M. F. Randolph
James Lord
INVENTORS:
Jacob P. Wright
Charles F. Wright
BY
John R. Nolan
ATTORNEY

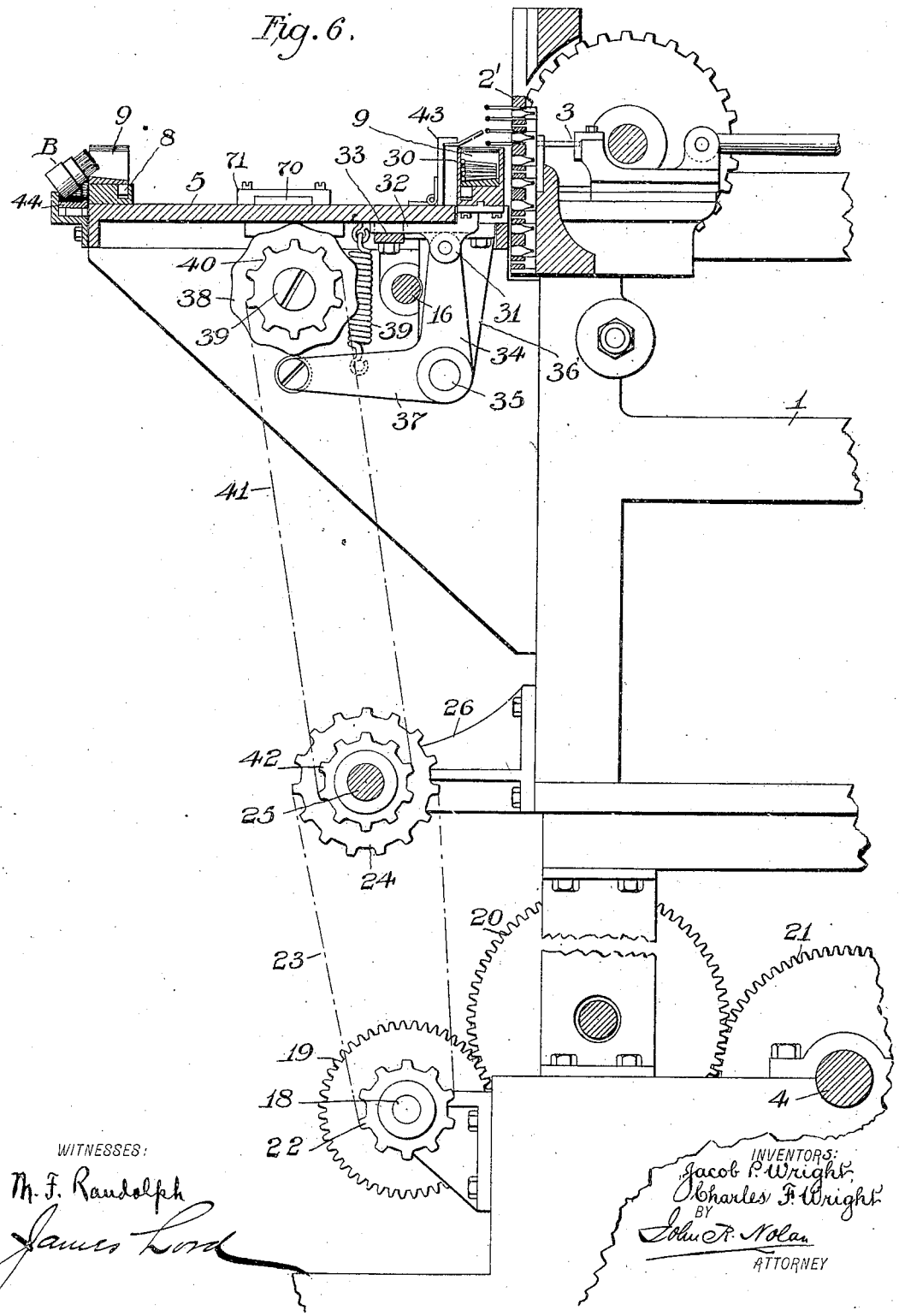

No. 836,729. PATENTED NOV. 27, 1906.
J. P. & C. F. WRIGHT.
BOX FILLING MACHINE.
APPLICATION FILED JUNE 30, 1903.
6 SHEETS—SHEET 4.
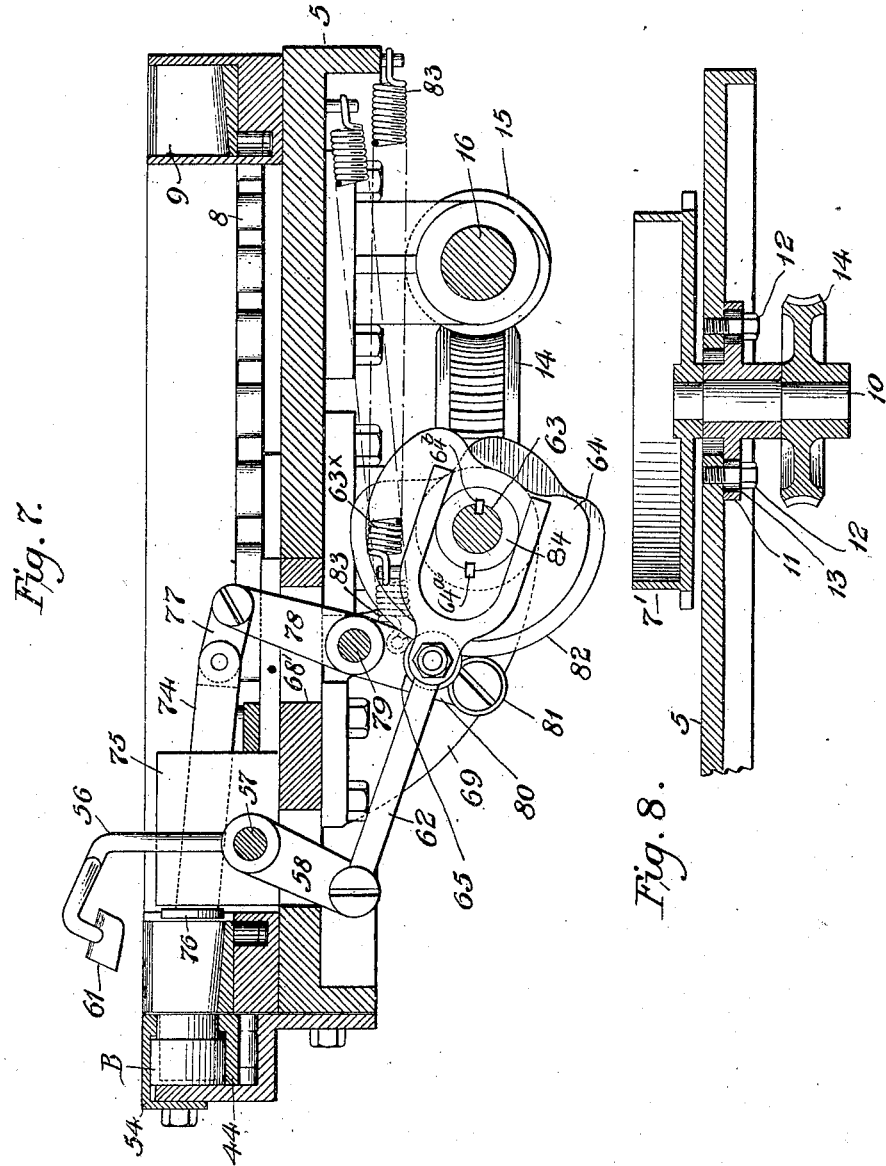
WITNESSES:
M. F. Randolph
James Lord
INVENTORS:
Jacob P. Wright
Charles F. Wright
BY
John R. Nolan
ATTORNEY
THE NORRIS PETERS CO., WASHINGTON, D. C.

No. 836,729. PATENTED NOV. 27, 1906.
J. P. & C. F. WRIGHT.
BOX FILLING MACHINE.
APPLICATION FILED JUNE 30, 1903.
6 SHEETS—SHEET 5.
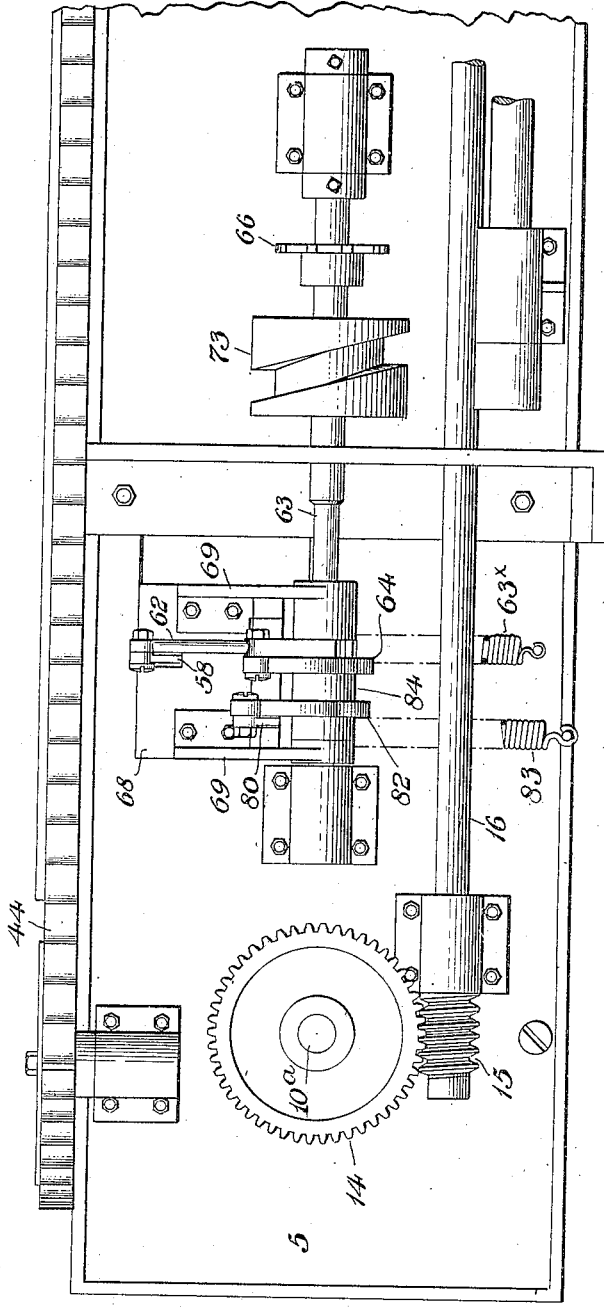
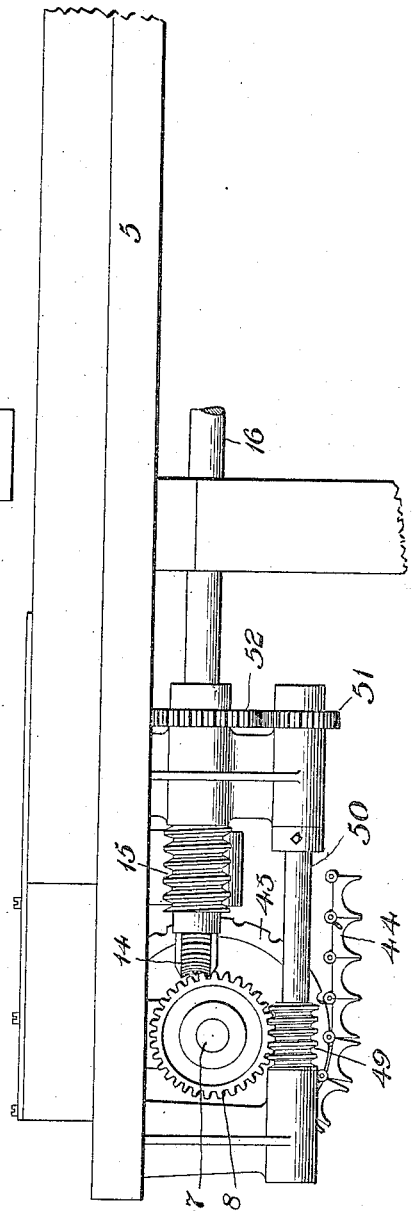
Fig. 9.
Fig. 10.
WITNESSES:
M. J. Randolph
James Lord
INVENTORS:
Jacob P. Wright
Charles F. Wright
BY
John R. Nolan
ATTORNEY No. 836,729. PATENTED NOV. 27, 1906.
J. P. & C. F. WRIGHT.
BOX FILLING MACHINE.
APPLICATION FILED JUNE 30, 1903.

6 SHEETS—SHEET 6.

WITNESSES:
M. F. Randolph
James Lord

INVENTORS:
Jacob P. Wright
Charles F. Wright
BY
John R. Nolan
ATTORNEY

UNITED STATES PATENT OFFICE.

JACOB P. WRIGHT, OF AKRON, AND CHARLES F. WRIGHT, OF BARBERTON, OHIO, ASSIGNORS TO THE DIAMOND MATCH COMPANY, OF NEW YORK, N. Y., A CORPORATION OF ILLINOIS.

BOX-FILLING MACHINE.

No. 836,729.     Specification of Letters Patent.     Patented Nov. 27, 1906.

Application filed June 30, 1903. Serial No. 163,669.

*To all whom it may concern:*

Be it known that we, JACOB P. WRIGHT, a resident of Akron, and CHARLES F. WRIGHT, a resident of Barberton, in the county of Summit and State of Ohio, citizens of the United States, have invented certain new and useful Improvements in Box-Filling Machines, of which the following is a specification.

This invention relates generally to machines for filling boxes with matches, toothpicks, or other similarly-formed articles, having reference more especially to novel mechanism for automatically filling cylindrical boxes with wax matches or "vestas" as the latter are discharged from a match-making machine.

In the present embodiment of our invention we employ an endless traveling carrier mounted in close relation to the discharging portion of a match-machine and provided with suitably-arranged receptacles into which the matches are delivered in combination with means whereby boxes are fed progressively to or adjacent said receptacles and means whereby the contents of the receptacles are transferred therefrom to the boxes, together with various novel structural features and combinations of parts, all coöperating to produce a simple and efficient box-filling apparatus, as will be hereinafter particularly described and claimed.

Figure 11:
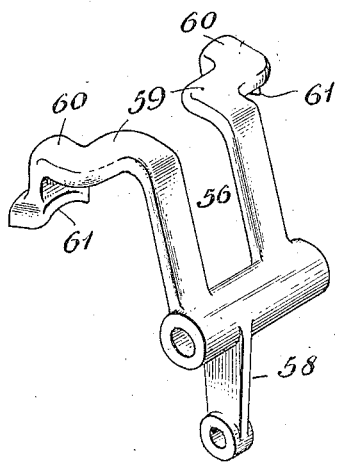
Figure 12:
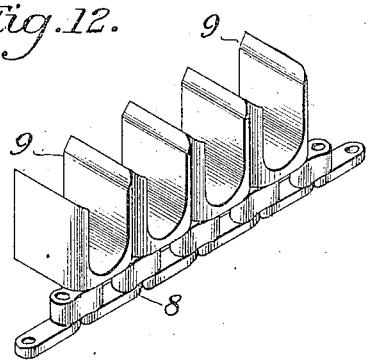
Figure 13:
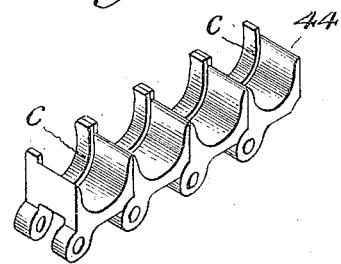
Figure 14:
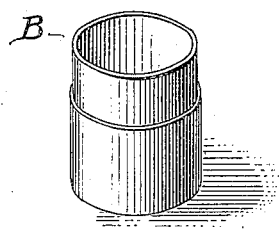

In the annexed drawings, Figure 1 is a plan of a box-filling machine embodying our invention. Fig. 2 is a sectional detail of the traveling match and box carriers and adjuncts as on the line 2 2 of Fig. 1. Fig. 3 is a plan of the shaker-trough detached. Fig. 4 is a front elevation of the machine, a portion of the endless box-carrier and other parts being omitted. Fig. 5 is a sectional detail illustrating the connection with its operating-cam of the reciprocating match-guide and pusher-carriage. Fig. 6 is a transverse vertical section as on the line 6 6 of Fig. 1, a portion of the match-carrier of the match-machine and also a filled match-box in the box-carrier being shown. Fig. 7 is a partial transverse vertical section as on the line 7 7 of Fig. 1. Fig. 8 is a sectional detail through the adjustable sprocket-wheel and adjuncts at one end of the filler-machine bed. Fig. 9 is a view from the under side of a portion of one end of said bed and the mechanism thereon. Fig. 10 is a rear elevation of a portion of the machine at the opposite end to that shown in Fig. 9. Fig. 11 is a perspective view of the guide-lever for acting upon the matches within the temporary holders. Fig. 12 is a similar view of a portion of the chain of temporary holders. Fig. 13 is a like view of a portion of the box-carrier. Fig. 14 is a perspective view of a box such as our invention is designed to fill.

1 designates a portion of the main frame of a match-making machine; 2', a portion of the match-carrier; 3, the reciprocating punch-head for ejecting the matches row by row from the carrier, and 4 the main driving-shaft of the machine. These parts being of any usual or approved construction need no detailed description herein.

Affixed to the end of the machine-frame in position to extend transversely thereof on a plane below the line of discharge of the matches from the carrier is a horizontal bed 5, at the respective ends of which are mounted sprocket-wheels 6' 7'. Passing around these wheels is an endless sprocket-chain 8, provided throughout its length with receptacles 9, which are arranged to travel adjacent the match-carrier and to receive the matches discharged therefrom. These receptacles constitute temporary holders for the matches. They form, in effect, links of the sprocket-chain and comprise in the present instance blocks having therein U-shaped recesses of a width slightly greater than the length of the matches to be boxed and of a depth exceeding the diameter of a box. The internal walls of the recesses are beveled from end to end, so as to compensate for the "head" ends of the matches as the latter lie within the recesses, as shown. Thus constructed each receptacle is open at its top and ends. The adjoining receptacles of the train or series are in close proximity to each other, and their upper edges are preferably beveled or tapered, as shown, to facilitate the entrance of the matches to the holders.

The vertical shaft 10 of the sprocket-wheel 7' has its bearing preferably in an adjustable block 11 on the under side of the bed, the connection of such block with the bed being conveniently effected by means of screws 12, passing through slots 13 in the block. (See Fig. 8.) The lower ends of the shafts 10 10$^a$ of the two sprocket-wheels carry worm-wheels 14, which gear with worms 15 on the respective ends of a horizontal shaft 16, that is mounted in brackets 17, depending from the bed. The shaft 16 is driven in any suitable manner.

In the present instance it is illustrated as geared with the main shaft as follows: 18 is a stud-shaft mounted in a bearing on the main frame and provided with a gear-wheel 19, which is geared through an intermediate gear 20 with a gear-wheel 21 on the main shaft. The stud-shaft 18 carries a sprocket-wheel 22, which is connected, by means of a sprocket-chain 23, with a similar wheel 24 on a counter-shaft 25, having its bearings in brackets 26 on the main frame, and this counter-shaft in turn is provided with a sprocket-wheel 27, which is connected, by means of a chain 28, with a wheel 29 on the worm-shaft 16. Thus motion is transmitted from the main shaft to the worm-shaft and thence positively to the shafts carrying the sprocket-wheels for the chain of temporary holders, thereby continuously impelling the latter across the path of the stream of matches ejected from the match-carrier. This chain during its traverse in front of the match-carrier is jarred or agitated in a manner to cause the matches to settle down within the temporary holders. For this purpose a trough 30, constituting a runway for the chain, is provided, together with means for transversely agitating the trough. The trough is preferably composed of several sections, in the present instance three. The middle section $a$ extends entirely across the front of the match-carrier and is jointed at its ends, as at $x$, to the other sections $b$, and the latter at their outer extremities are pivoted to the bed, as at $y$. (See Fig. 3.) On the under side of the middle section are suitably-disposed brackets 31, provided with horizontal extensions 32, which are slidingly fitted to guides 33 on the bed. Pivoted to these brackets are the upper ends of arms 34, rising from a rock-shaft 25, which has its bearings in brackets 36 on the under side of the bed. One of the arms is an arm of an angle-lever on said shaft, the other arm 37 of the lever extending below a suitably-disposed cam 38 and being held operatively in contact therewith by means of a retracting-spring 39, which is secured at its respective ends to the lever-arm 37 and to the bed. The cam 38 is provided with alternate peripheral elevations and depressions and is mounted on a stud-shaft 39, having its bearing in a bracket on the bed. This shaft is equipped with a sprocket-wheel 40, which is connected, by means of a chain 41, with a similar wheel 42 on the shaft 25, above referred to. (See Fig. 6.) Thus the cam is positively rotated and in consequence the trough is rapidly vibrated transversely.

By making the trough in sections and pivotally connecting and mounting them as described the greatest extent of vibration is imparted to the middle section (where the matches are introduced to the holders) and thence gradually to the outer extremities of the trough. Thus a gradually-increasing vibration of the chain of holders is had while the holders are passing to the carrier, and a gradually-decreasing vibration is had while the holders supplied with matches are passing from the carrier. This operation avoids an abrupt stoppage of the agitating action upon the matches when the motion of the machine is arrested, and hence the otherwise liability of disarranging the matches in the holders is obviated.

To insure the disposition of the matches in the temporary holders as the matches are ejected row by row from the carrier and also to obviate all liability of the matches being accidentally thrown from said holders during the jarring operation, we hinge to the bed, adjacent the middle section of the trough, an angular guard 43, which is arranged to be swung over and from said section as desired. The forward edge of the guard, as will be observed, is inclined upward through its length, so as to lie slightly above the plane of discharge of the matches from the carrier when the guard is swung over the trough, and thus to permit the free and unobstructed passage of the matches to the holders.

The temporary holders with their contents pass around the sprocket-wheel 6' at one end of the bed, and the matches are then pushed endwise from the holders into suitable boxes.

In the present instance cylindrical boxes B of slightly less depth than the length of a match are employed, and they are fed progressively into position for the reception of the matches, as follows:

44 represents an endless carrier, termed a "box-carrier," comprising hingedly-connected links provided with semicircular recesses therein which correspond in number and relation with the temporary holders and are arranged to travel adjacent to and at the same rate of speed as said holders. The carrier 44 passes around a pair of sprocket-wheels 45, arranged at the respective ends of the bed, one of which wheels is mounted to turn loosely on a stud-shaft 46, fixed to a bracket on the under side of the bed, and the other of which wheels is fast on a driven shaft 47, having its bearings in brackets on said bed. The driven shaft is provided at one end with a worm-wheel 48, which coacts with a worm 49 on a lower shaft 50, the latter shaft being provided with a pinion 51, which is geared with a spur-wheel 52 on the worm-shaft 16, hereinbefore described. (See Fig. 10.) Thus a uniform continuous motion is positively transmitted to the box-carrier. The width of each of the links is equal to the length of a box to be filled, and the diameter of the recess in the link is equal to that of the box, or substantially so. The bottom of the recess is preferably provided at its inner end with a shouldered portion $c$ to correspond with the reduced portion of the box which receives the cap or cover.

The empty boxes, bottom outward and mouth inward, are fed side by side to the carrier 44 by means of an inclined chute 53, which is kept supplied with boxes by an attendant. The lower end of the chute is closed on all sides and is curved downward toward the carrier, so as to deliver the boxes one by one to the succeeding links of the traveling carrier. Adjacent the chute is a horizontally-disposed angle-piece 54, which overhangs the runway and the box-carrier for a predetermined distance and insures the horizontal disposition of the boxes in the recessed links, the top of the piece being preferably turned or inclined upward at its chute end, as at 55, to exert a depressing cam action upon the boxes as they pass from the chute to the carrier. (See Fig. 2.)

While the boxes are confined by the angle-piece just mentioned the matches in the proximate temporary holders are introduced thereto. The means which we prefer to employ for this purpose is as follows:

56 represents a pair of members rising from a rock-shaft 57, which is mounted in a horizontally-movable carriage on the bed. These members constitute, in effect, the bifurcated arm of a lever, the other arm 58 whereof depends below the bed. The upper ends of the members 56 extend outwardly, as at 59, and then forwardly, as at 60, terminating in guide-pieces 61, which have concave recesses on their under sides, as shown. The guide-pieces during the actuation of the lever are adapted to enter the temporary holders and set the contained matches in position for ready insertion in the opposing boxes by the action of adjacent push devices, which are also mounted on the carriage, as hereinafter described.

The lever-arm 58 is pivoted to one end of an arm 62, the opposite end of which is bifurcated to embrace a longitudinally-disposed shaft 63, mounted in brackets on the bed. On this shaft is a cam 64, against which is yieldingly held a roller 65 on the arm 62 by means of a spring $63^\times$, secured at its respective ends to the said arm and bed, whereby during the operation of the shaft 63 the lever is oscillated and the guide-pieces thereon are moved in a vertical arc into and from the temporary holders. (See Fig. 7.)

The action of the spring $63^\times$ is to effect the depression of the guide-pieces yieldingly upon the matches, and the function of the cam is to control the descent of such pieces and to effect their elevation. Hence should any of the matches in a holder or holders be disarranged or awry the guide-pieces will yield to the abnormal condition, and thus obviate the otherwise liability of crushing the matches.

The shaft 63 is driven from the countershaft 25 by means of a sprocket-chain 65, passing around wheels 66 67 on the respective shafts.

The carriage 68, on which the guide-lever and push devices are mounted, is moved longitudinally back and forth in respect to the horizontal travel of the chain of temporary holders in order that the continuous movement of the latter will be uninterrupted during the operation of guiding and inserting the matches in the boxes. This carriage in the present instance comprises a plate fitted to and guided in a suitable opening in the bed and provided on its under side with a pair of depending bracket-arms 69, which are slidingly mounted on the shaft 63.

Extending from one end of the plate is a bar 70, which is preferably guided in a block 71 on the bed and which bar is furnished with a stud 72, Fig. 5, that depends through a slot in the bed into a peripherally-grooved cam 73, fast on the shaft 63. The contour of this cam is designed to effect the reciprocations of the carriage in synchronism with the continuous travel of the chain of temporary holders and the movements of the guide and push devices.

The devices for pushing the matches into the boxes comprise a pair of plungers 74, fitted in guides 75 on the carriage, so as to be movable across the path of travel of the temporary holders. These plungers are arranged to reciprocate below the respective guide members and are provided at their forward or free ends with pressure-heads 76, that are shaped to fit snugly within the holders. The rear ends of the plungers are connected, by means of links 77, with a pair of arms 78, rising from a rock-shaft 79, mounted on the carriage. Depending from this shaft is an arm 80, which carries a roller 81, that is held yieldingly engaged with a cam 82 on the shaft 63 by means of a retracting-spring 83, secured at its respective ends to the arm and bed, whereby the said arm is oscillated at predetermined intervals and the plungers accordingly reciprocated. (See Fig. 7.) The tendency of the spring is to move the plungers yieldingly against the opposing ends of the matches, while the operation of the cam is to guide the plungers in their inward movement and to insure their positive return. Hence should any matches be longer than others or should they, or any of them, be displaced, so as to abut against the edge of the box, the plungers will yield to the opposing match or matches, and thus obviate the otherwise liability of breaking or jamming such match or matches.

The cams 64 82 are mounted to slide longitudinally of the shaft 63 during the horizontal movement of the carriage. Accordingly said cams are secured to a sleeve 84, which has a sliding connection with the shaft and is arranged between the depending bracket-arms.

In the present instance the cams 64 82 are secured to the periphery of the sleeve by a key $64^a$, and the sliding connection between the sleeve and the shaft comprises a spline or feather $64^b$, affixed to the inner surface of the sleeve and slidingly fitted to a longitudinal groove or way in the shaft. (See Fig. 7.)

The relative timing of the respective cams is such that at the outset the guide-pieces descend to embrace the matches in the underlying temporary holders, and immediately thereafter the plungers commence to advance against the opposing ends of the matches. As soon as the matches slightly enter the boxes the guide-pieces ascend, and the plungers continuing their stroke push the matches into the boxes. The plungers are then retracted, and the parts assume their previous position for a succeeding operation. The guide devices, with their coöperating pushers, are mounted to act within alternate temporary holders as the latter are continuously advanced.

The runway for the box-carrier on the front of the bed is constructed to guide the carrier in parallelism with the chain of temporary holders while the carrier is traveling within the guide 54, so that the boxes will rest horizontally in the carrier during the introduction of the matches thereto. Beyond the guide for a predetermined distance—say to the point $z$, Fig. 2—the runway inclines gradually downward and then extends in a horizontal plane to the opposite end of the bed. As illustrated, the box-carrier during its travel assumes the inclination and path of the runway.

Inasmuch as the matches are slightly longer than the boxes and as the projecting ends of the matches therefore rest in the temporary holders, it follows that as the boxes are carried down the inclination the inner or open ends of the boxes are gradually tilted upward and that in such inclined position the filled boxes are carried onward to the opposite side of the machine. In order still further to tilt the boxes during their trave se, I interpose between the two carriers a thin metal plate 85, the upper edge of which is gradually inclined above the bottoms of the temporary holders, as at 86, Fig. 4, so as to afford a cam-surface for the projecting ends of the matches in the boxes as the latter progress. Such tilting of the boxes not only causes the matches to settle within the boxes, but permits the filled boxes to be readily removed from the carrier preparatory to applying the caps or covers to the boxes. We prefer to transfer the boxes automatically from the carrier to a table 86 (or other suitable support) adjacent thereto, and as a simple and efficient means to this end we dispose in the path of the inclined boxes a cam-like strip 87, which curves outwardly from the bed and overhangs the box-carrier, as shown in Fig. 1. It will be seen that as the tilted boxes approach the piece 87 and contact therewith such piece acts as a cam to move the boxes successively to an upright position and direct them out from the carrier upon the table ready for removal by an attendant.

We claim—

1. In a box-filling machine, the combination of an endless chain of flexibly-connected temporary match-holders adapted throughout its course to travel in a horizontal path, or substantially so, means for progressively supplying matches to the holders of one of the longitudinal stretches of said chain, an endless chain of flexibly-connected box-holders arranged to travel laterally adjacent to, and in parallelism with, the other longitudinal stretch of said chain of match-holders, or substantially so, means for concurrently actuating said chains whereby the adjacent portions thereof are impelled in the same direction and at the same rate of speed and their respective holders thus maintained in register, and means for transferring the matches from the said match-holders into boxes carried by the said box-holders.

2. In a box-filling machine, the combination with a temporary holder having an open top and an open end and having also its internal walls inclined from end to end to compensate for the enlarged head ends of matches contained in said holders, of means for supporting a box adjacent to the open end of said holder, and means for pushing the contents of said holder endwise into the box.

3. In a box-filling machine, the combination of an endless chain of flexibly-connected temporary match-holders adapted throughout its course to travel in a horizontal path, or substantially so, means for progressively supplying matches to the holders on one of the longitudinal stretches of said chain, an endless chain of flexibly-connected box-holders arranged to travel laterally adjacent to, and in parallelism with, the other longitudinal stretch of said chain of match-holders, or substantially so, and to support boxes with their mouths directed toward the said match-holders, means for concurrently actuating said chains whereby the adjacent portions thereof are impelled in the same direction and at the same rate of speed and their respective holders thus maintained in register, and means for acting directly upon the ends of the matches in said match-holders during their travel and thereby moving such matches endwise into the adjacent boxes.

4. In a box-filling machine, the combination of an endless chain of flexibly-connected temporary match-holders adapted throughout its course to travel in a horizontal path, or substantially so, means for progressively supplying matches to the holders on one of the longitudinal stretches of said chain, an endless chain of flexibly-connected box-holders arranged to travel laterally adjacent to, and in parallelism with, the other longitudinal stretch of said chain of match-holders, or substantially so, means for concurrently actuating said chains whereby the adjacent portions thereof are impelled in the same direction and at the same rate of speed and their respective holders thus maintained in register, means for transferring the matches from the said match-holders into boxes carried by the said box-holders, and a guide device movable upon and from the contents of the traveling match-holders and adapted to settle the contained matches in position for ready insertion into the boxes.

5. In a box-filling machine, the combination of an endless series of flexibly-connected temporary match-holders, means for continuously impelling the same, means for progressively supplying said holders with matches during their travel whereby a predetermined quantity is delivered to each holder, a guide device movable into and from the successive holders during their traverse and temporarily along therewith, and means for discharging the contents of each holder during the travel of the same and while the guide device is disposed thereon.

6. In a box-filling machine, the combination with an endless series of linked temporary holders whereof each holder is open at its top and end, of an endless series of linked members for supporting boxes adjacent the open ends of said holders, means for pushing the contents of said holders endwise into the boxes, and means for progressively moving said holders and members in the same direction and at the same speed whereby the boxes travel in close relation to the temporary holders.

7. In a box-filling machine, the combination of an endless chain of temporary holders, an endless chain of box-holders adjacent thereto, means for impelling said chains in the same direction and at the same rate of speed, means for progressively supplying the temporary holders with free matches or splints during their travel, whereby a predetermined quantity is delivered to each temporary holder, and means independent of the temporary holders for acting directly upon the ends of the matches or splints in the latter and moving them directly into the opposing boxes in the box-holders.

8. In a box-filling machine, the combination of an endless chain of temporary holders, an endless chain of box-holders adjacent thereto, means for impelling said chains in the same direction and at the same rate of speed, means for progressively supplying the temporary holders with free matches or splints during their travel, whereby a predetermined quantity is delivered to each temporary holder, means for supplying boxes to the said box-holders, and means independent of the temporary holders for acting directly upon the ends of the matches or splints in the latter and moving the same endwise into the opposing boxes.

9. In a box-filling machine, the combination with an endless chain of links whereof the upper links comprise recessed or open temporary holders for the matches to be boxed, of an endless chain of linked box-holders adjacent the path of travel of the said temporary holders, and means for driving said chains in concert, with their respective holders in register with each other.

10. In a box-filling machine the combination of an endless chain of temporary holders for matches, an endless chain of linked holders for match-boxes adjacent the path of travel of said temporary holders, sprocket-wheels for the respective chains having their axes at right angles to each other, or substantially so, and actuating mechanism for the said wheels whereby the chains are driven in concert, with their respective holders in register with each other.

11. In a box-filling machine, the combination with an endless traveling carrier for supporting and carrying a box in horizontal position, of means for introducing matches endwise to said box, and means for tilting the filled box.

12. In a box-filling machine, the combination with an endless traveling carrier for supporting and carrying a box in horizontal position, of means for introducing matches endwise to said box, means for tilting the filled box, and means for setting the box upright.

13. In a box-filling machine, the combination with an endless traveling carrier for supporting and carrying a box in horizontal position, of means for introducing matches endwise to said box, means for tilting the filled box, and means for setting the box upright and moving it away from the means first named.

14. In a box-filling machine, the combination with a traveling carrier having means to support boxes in horizontal position, of means for introducing matches endwise to said boxes, and a cam arranged in the path of the projecting ends of the matches in said boxes and adapted thereby to tilt the boxes during their traverse.

15. In a box-filling machine, the combination with a traveling carrier having means to support boxes in horizontal position, of means for introducing matches endwise to said boxes, a cam arranged in the path of the projecting ends of said matches and adapted thereby to tilt the boxes during their traverse, and a cam arranged in the path of the tilted boxes and adapted to set them upright and deflect them from the carrier.

16. In a box-filling machine, the combination with a traveling chain of temporary holders for matches, of a traveling box-carrier adjacent the path of said holders, means for supplying boxes to said carrier, means for pushing the matches from the temporary holders into said boxes with the outer ends of the matches projecting into the holders, and means for guiding the said carrier in parallelism with the chain of holders during the insertion of the matches in the boxes and thereafter for a predetermined distance in a plane inclined to that of said holders.

17. In a box-filling machine, the combination with a traveling chain of temporary holders for matches, of a traveling box-carrier adjacent the path of said temporary holders, means for supplying boxes to said carrier, means for pushing the matches from the temporary holders into said boxes with the outer ends of the matches projecting into the temporary holders, means for guiding the said carrier in parallelism with the chain of temporary holders during the insertion of the matches in the boxes, and thereafter for a predetermined distance in a plane inclined to that of said temporary holders, and a cam arranged in the path of the projecting ends of said matches and adapted to tilt the boxes during their traverse.

18. In box-filling machine, the combination with a traveling chain of temporary holders for matches, of a traveling box-carrier adjacent the path of said temporary holders, means for supplying boxes to said carrier, means for pushing the matches from the temporary holders into said boxes with the outer ends of the matches projecting into the temporary holders, means for guiding the said carrier in parallelism with the chain during the insertion of the matches in the boxes, and thereafter for a predetermined distance in a plane inclined to that of said holders, a cam arranged in the path of the projecting ends of said matches and adapted to tilt the boxes during their traverse, and means for setting the tilted boxes upright and moving them away from the carrier.

19. In a box-filling machine, the combination with series of temporary holders, and means for continuously moving the same, of a guide device movable into and from said temporary holders, and means for moving said device in the direction of motion of the holders and back again.

20. In a box-filling machine, the combination with a series of temporary holders each of which is constructed with a pocket or receptacle to contain a quantity of loose matches, and means for continuously moving the said holders, of a pusher, means for reciprocating the same across the path of said holders, and means for moving said pusher in the direction of motion of the holders and back again.

21. In a box-filling machine, the combination with a series of temporary holders, and means for continuously moving the same, of a guide device, means for moving it into and from said holders, a puncher, means for moving it across the path of said holders, and means for moving said guide device and pusher in the direction of motion of the holders and back again.

22. In a box-filling machine, the combination with a series of temporary holders each of which is constructed with a pocket or receptacle to contain a quantity of loose matches, and means for continuously moving the said holders, of a carriage adjacent the path of said holders, means for moving said carriage in the direction of motion of the holders and back again, guide and push devices on said carrier, and means on the carriage for operating said guide and push devices.

23. In a box-filling machine, the combination with an endless chain of temporary holders, and means for continuously moving the same, of an endless carrier provided with box-receptacles corresponding with said holders, means for continuously moving said carrier at the same speed as the chain of holders, a pusher, means for moving the same across the path of said holders, and means for moving said pusher in the direction of motion of the holders and back again.

24. In a box-filling machine, the combination with an endless chain of temporary holders, and means for continuously moving the same, of an endless carrier provided with box-receptacles corresponding with said holders, means for continuously moving said carrier at the same speed as the chain of holders, a guide device, means for moving it into and from said holders, a pusher, means for moving it across the path of said holders, and means for moving said guide device and pusher in the direction of motion of the holders and back again.

25. In a box-filling machine, the combination with an endless series of flexibly-connected temporary holders for matches, means for continuously impelling the same, and means for progressively supplying said holders with free matches during their travel, whereby a predetermined quantity is delivered to each holder, of a guide device, and means for moving the same into and from the successive holders during their traverse and temporarily along therewith, said means including a spring to move the guide device yieldingly upon the contents of the holders and a cam to retract said device.

26. In a box-filling machine, the combination with an endless series of flexibly-connected temporary holders for matches, means for continuously impelling said holders, and means for progressively supplying said holders with free matches during their travel whereby a predetermined quantity is delivered to each holder, of mechanism for directly engaging the ends of the matches in the traveling holders and thereby bodily discharging said matches endwise therefrom, said mechanism moving temporarily along with the holders.

27. In a box-filling machine, the combination with a series of temporary holders in which matches are loosely contained, means for progressively moving said holders along, and means for progressively supplying said holders with matches during their travel, whereby a predetermined quantity is delivered to each holder, of a reciprocating pusher for pushing the matches endwise from said holders during their traverse, and means for actuating said pusher, said means including a spring to move the pusher yieldingly against the matches, and a cam to retract the pusher.

28. In a box-filling machine, the combination with a temporary holder for matches, a guide device for said matches, and means for moving said device upon and from the matches, said means including a spring to move the guide device yieldingly upon the said contents, and a cam to retract said device, of a pusher for pushing the matches from the holder, and means for actuating said pusher including a spring to move the pusher yieldingly against the matches and a cam to retract the pusher.

29. In a box-filling machine, the combination with a series of traveling holders and actuating mechanism therefor, of a trough or way for said holders comprising a series of sections jointed together and pivotally supported at their outer extremities, and means for transversely jarring said trough or way.

30. The combination with the match-carrier of a match-machine, and means for discharging the matches from said carrier, of a series of traveling holders movable across the path of the matches discharged from said carrier, and a trough or way for said holders comprising several sections jointed together, one section extending throughout the width of said carrier, or substantially so, and the outer extremities of the trough being pivotally supported as described, together with means for transversely jarring said trough or way.

31. In a box-filling machine, the combination with a series of traveling holders, means for supplying matches thereto, and a guard-piece movable into a position overhanging the path of the said holders during the feeding of the matches to the holders.

32. The combination with the match-carrier of a match-machine, and means for discharging the matches from said carrier, of a series of traveling holders movable across the path of the matches discharged from the said carrier, a trough or way for said holders, means for jarring said trough or way, and a guard hinged adjacent said trough or way and movable into a position overhanging the holders therein.

Signed at Barberton, in the county of Summit and State of Ohio, this 25th day of June, A. D. 1903.

JACOB P. WRIGHT.
CHARLES F. WRIGHT.

Witnesses:
   B. C. Ross,
   O. A. Ticknor.